United States Patent
Grottesi

(10) Patent No.: US 6,401,559 B1
(45) Date of Patent: Jun. 11, 2002

(54) DIFFERENTIAL FOR DOLLY, PARTICULARLY FOR SHOOTING IN THE TV AND MOVIE FIELD

(76) Inventor: Armando Grottesi, Via Acqua Bullicante 37, 00177 Rome (IT)

( * ) Notice: Subject to any disclaimer, the term of this patent is extended or adjusted under 35 U.S.C. 154(b) by 0 days.

(21) Appl. No.: 09/599,511

(22) Filed: Jun. 23, 2000

(30) Foreign Application Priority Data

Jun. 25, 1999 (IT) ........................................ RM99A0413

(51) Int. Cl.[7] ................................................ F16H 3/08
(52) U.S. Cl. ........................ 74/333; 74/342; 280/47.11; 280/99
(58) Field of Search ................................ 280/47.11, 98, 280/99, 103; 74/333, 334, 342

(56) References Cited

U.S. PATENT DOCUMENTS 4,335,626 A * 6/1982 Fisher ........................... 74/496
5,375,863 A * 12/1994 Chapman ..................... 280/99
6,135,465 A * 10/2000 Chapman ................. 280/47.11

* cited by examiner

*Primary Examiner*—Sherry Estremsky
(74) *Attorney, Agent, or Firm*—Smith, Gambrell & Russell, LLP

(57) ABSTRACT

A differential for dolly, particularly for shootings in the TV and movie fields, comprising a first inlet axis, coupled with a selection and control bar, provided on the dolly, for the selection of one of the two steering wheels, four steering wheels or crab configuration, the inlet axis being provided with motion transmission for the two steering wheel configuration, with motion transmission for the four steering wheel configuration, and with motion transmission for the crab configuration; a motion output axis; and two lateral axes, respectively for the transmission to the wheel and to the right wheel, the inlet axis and the output axis providing central movable axis to selectively engage the transmission, coupled at the bottom with rocking levers, transmitting the position of the movable central axis of the inlet axis to the movable central axis of the output axis.

13 Claims, 18 Drawing Sheets

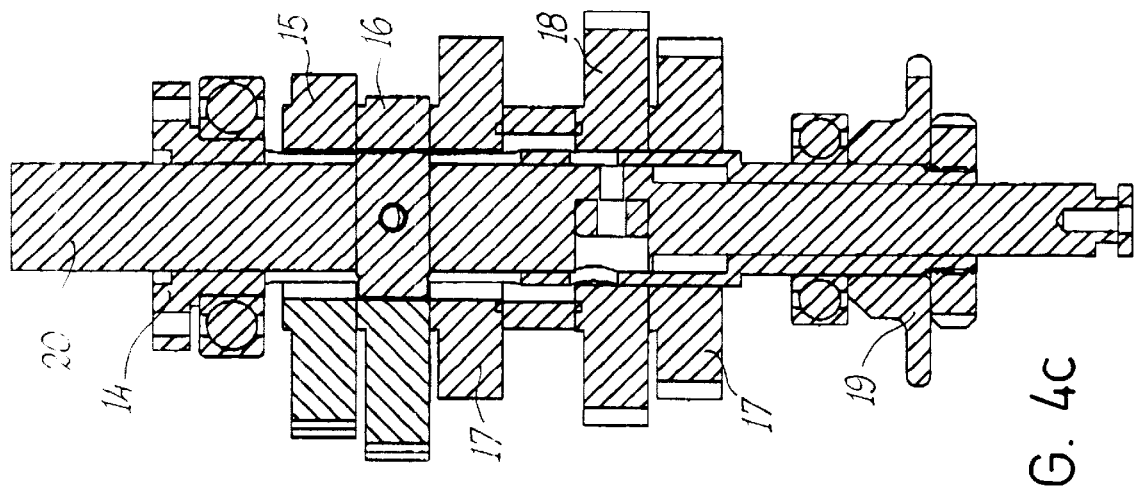
FIG. 4c
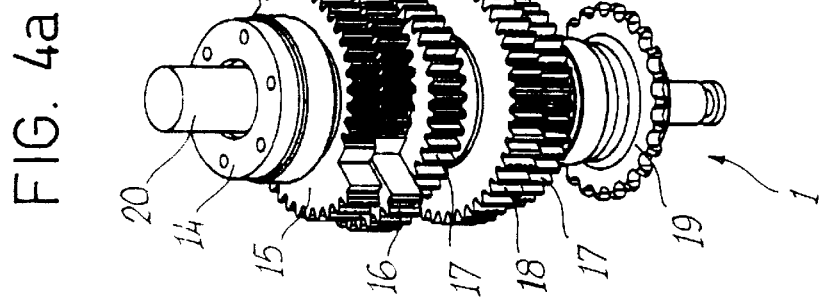
FIG. 4a
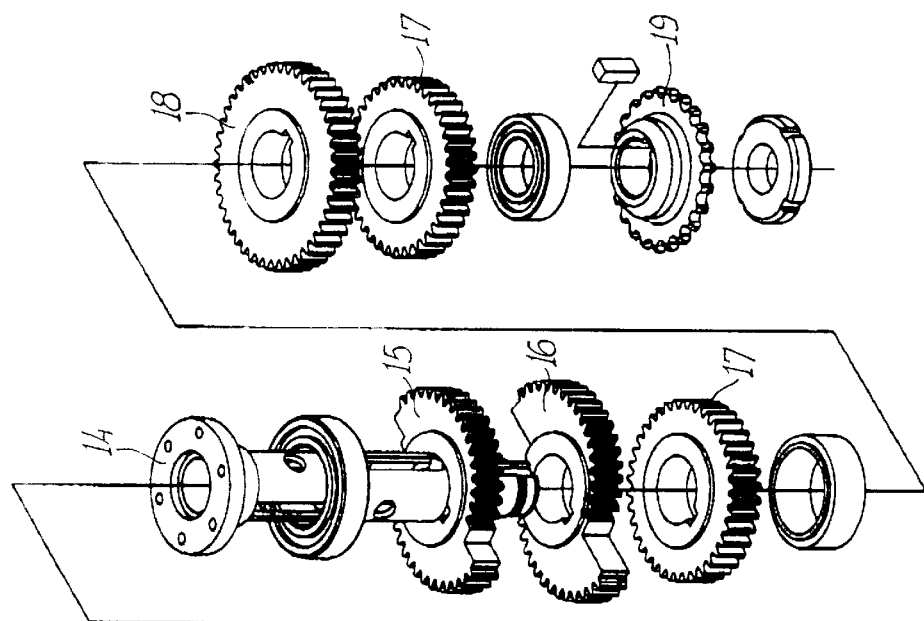
FIG. 4b
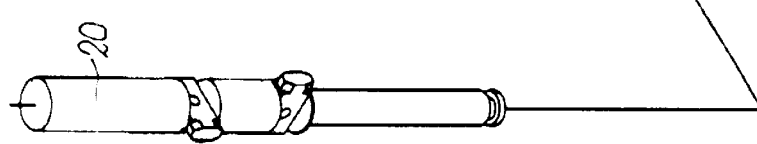

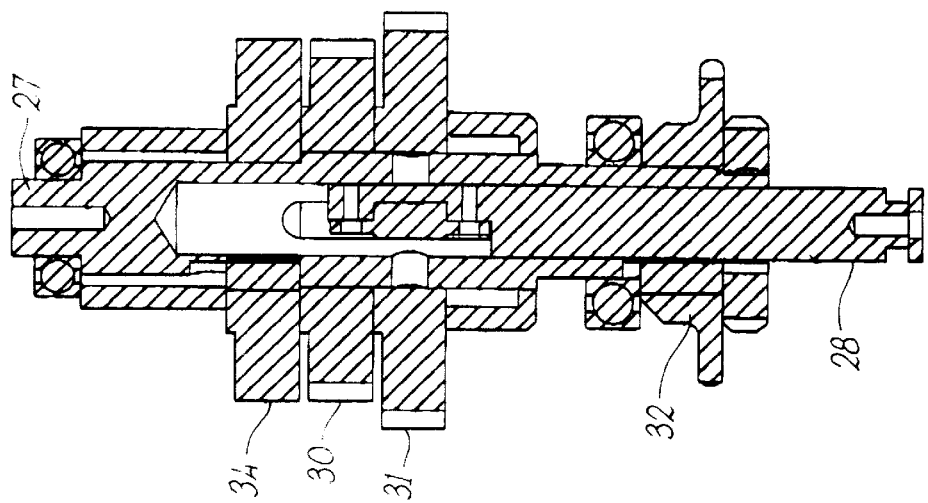
FIG. 6c
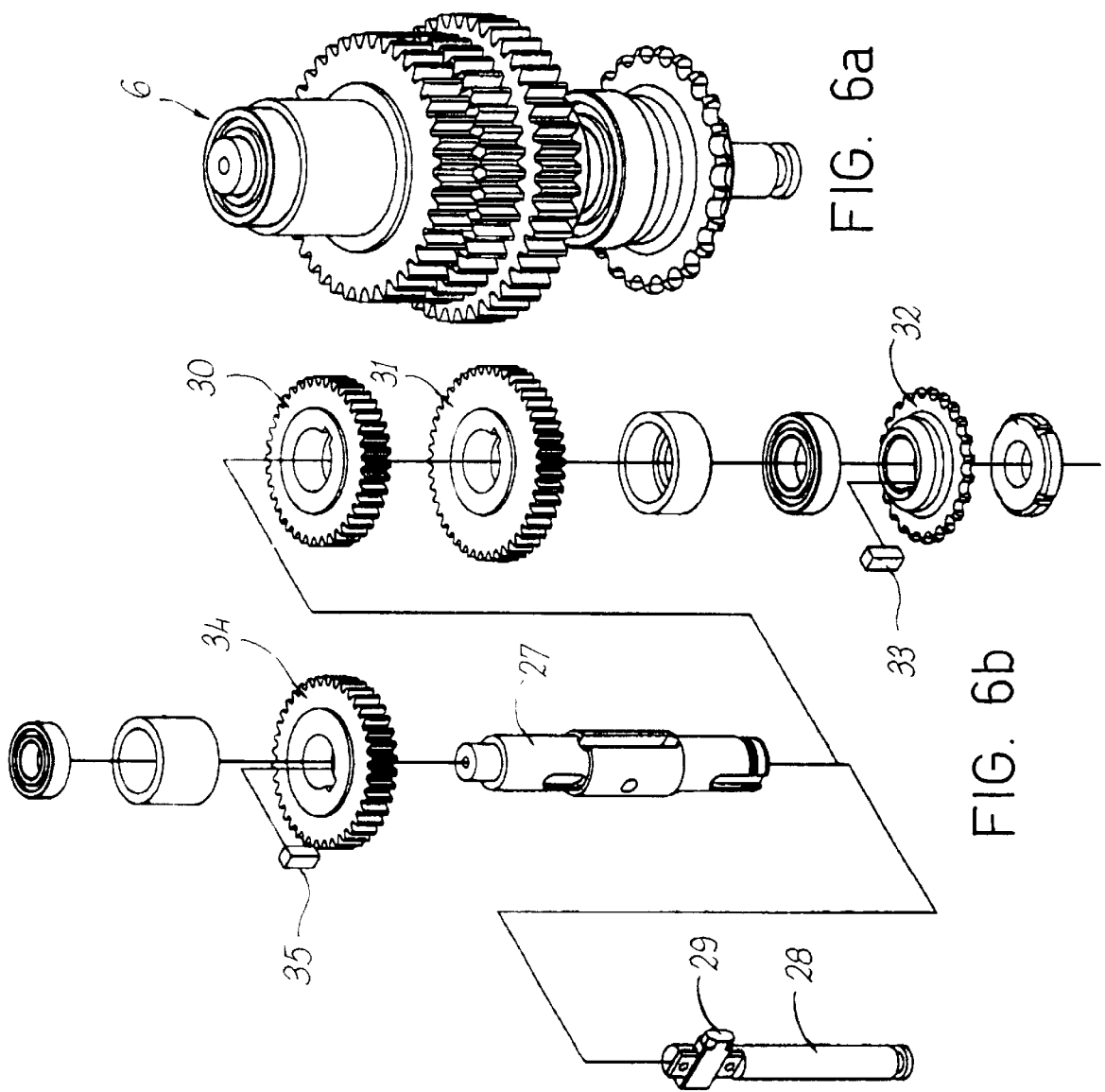
FIG. 6a
FIG. 6b

DIFFERENTIAL FOR DOLLY, PARTICULARLY FOR SHOOTING IN THE TV AND MOVIE FIELD

The invention relates to a differential for dolly, particularly for shootings in the TV and movie fields.

More specifically, the invention concerns a differential allowing to obtain by a single control all the configurations of the dolly's wheels required during the shootings.

As it is known, dollies are trolleys used since many years in the field of the shootings, on which the shooting means and the cameraman are placed, pushed by the man in charge of the manoeuvring of the same dolly.

It is a very delicate and basic instrument for shootings, since an optimum control of the dolly allow to make high quality shootings. To this end, many improvements of the same dollies have been realised during the recent years, aiming to obtain the most reliable, soft and silent operation.

It is also known that said trolleys can work both along rails and directly on the floor and that, according to the needing it can be necessary to operate with different steering configurations or modes, namely two steering wheels, four steering wheels, and with the so called "crab" configuration.

To obtain the different configurations of the wheels of the trolley, that is obviously provided with two front wheels and two rear wheels, it is necessary to provide different transmission means from the control bar on which the dolly operator acts.

At present, no solution exists allowing to directly and solely act on the control bar to indifferently obtain the above mentioned three configurations.

In fact, solutions presently available on the market provide on the control bar only the possibility of configuring the wheels according to the crab configuration and with two steering wheels, while to obtain the four steering wheels configuration different control and actuation means are provided in some solutions, or, in other cases it is even necessary to directly operate on the wheels of the dolly to obtain the required configuration.

It is evident that said solutions are not particularly advantageous for many reasons, particularly to be connected with practical considerations, deriving from the needing of interrupting the use of the dolly to obtain the different configurations, solution not accessible by the final user, structurally complex and expensive.

The above is due to the fact that none has been able until now to realize a technical solution allowing to have a differential suitable to obtain by the same control bar all the three required configurations.

In view of the above, the Applicant has studied and realized a technical solution for a differential able to solve all the above mentioned problems.

Particularly, main object of the present invention is that of providing a technical teaching for the realization of a differential allowing to obtain all three the configurations, respectively two and four steering wheels and crab, only acting on the control bar.

It is therefore specific object of the present invention, a differential for dolly, particularly for shootings in the TV and movie fields, comprising a first inlet axis, coupled with a selection and control bar, provided on the dolly, for the selection of one among the two steering wheels, four steering wheels or crab configuration, said inlet axis being provided with motion transmission means for the two steering wheel configuration, with motion transmission means for the four steering wheel configuration, and with motion transmission means for the crab configuration; a motion output axis; and two lateral axes, respectively for the transmission to the left wheel and to the right wheel, said inlet axis and said output axis providing central movable axis to selectively engage said transmission means, coupled at the bottom with rocking lever means, transmitting the position of the movable central axis of the inlet axis to the movable central axis of the output axis.

Preferably, according to the invention, said lateral axes provide motion transmission means to the relevant rear wheel and blocking means for the same wheels in case of two steering wheel configuration.

According to a first embodiment of the differential according to the invention, said two steering wheel and four steering wheel motion transmission means can provide elliptical gears, provided on said inlet, transmission and output axes, having a profile suitable to the kind of selected motion.

In a second embodiment of the differential according to the invention, said two steering wheel and four steering wheel motion transmission means can provide cam structures, preferably double cam structures, with a profile realised on said cam, shaped in function of the particular motion to be transmitted, slide guided by rolls, the motion of the transmission axis and/or output axis being transmitted by chains or direct transmission.

Always according to the invention, said inlet, transmission, output and right and left axes can be provided between an upper plate and a lower plate, holes being provided on said plates for the passage of said axes.

Furthermore, according to the invention, said axis can be coupled by motion transfer gears.

The present invention will be now described, for illustrative but not limitative purposes, according to its preferred embodiments, with particular reference to the figures of the enclosed drawings, wherein.

Figure 1:
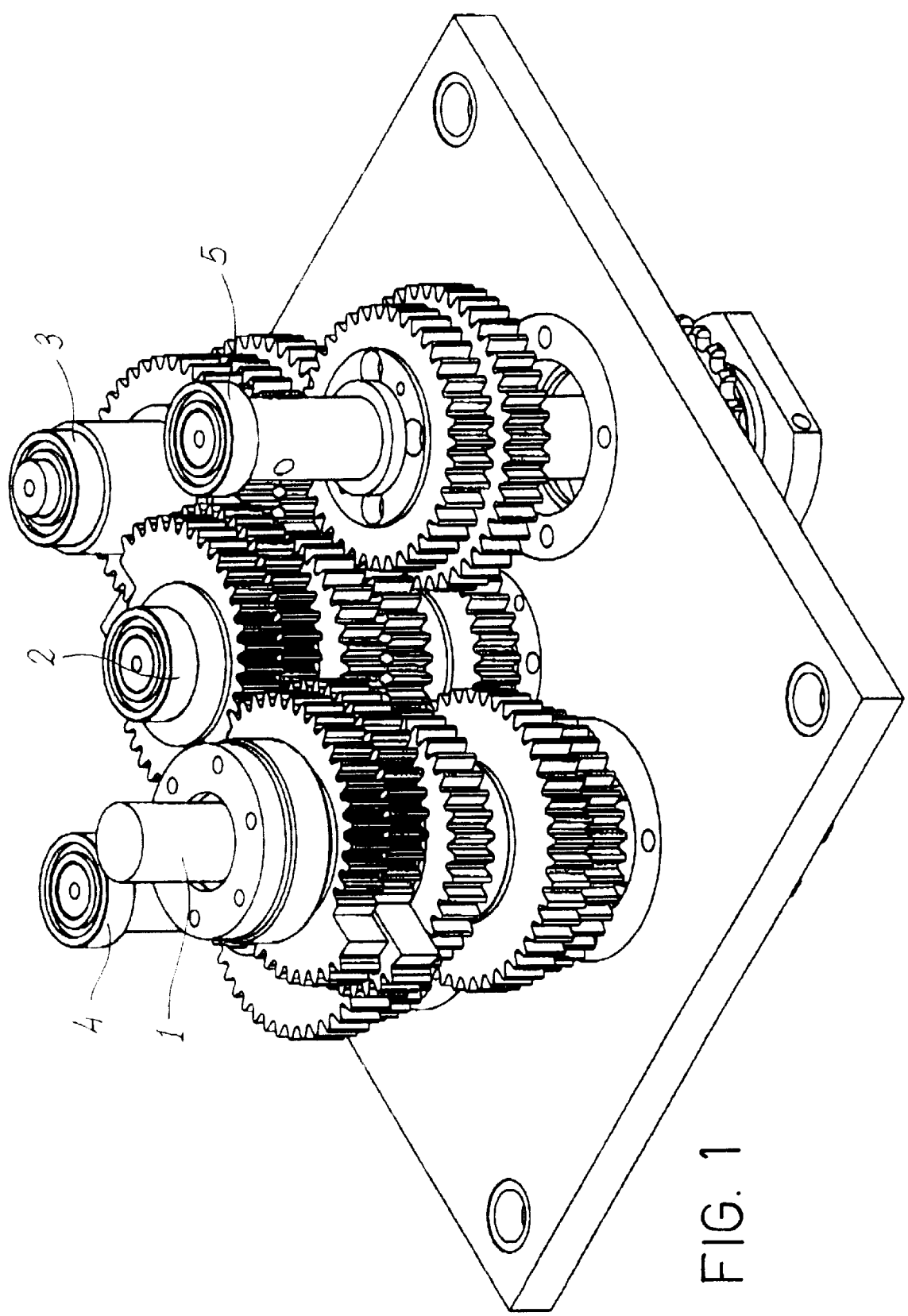
FIG. 1 is a perspective view of a first embodiment of the differential according to the invention.
Figure 2:
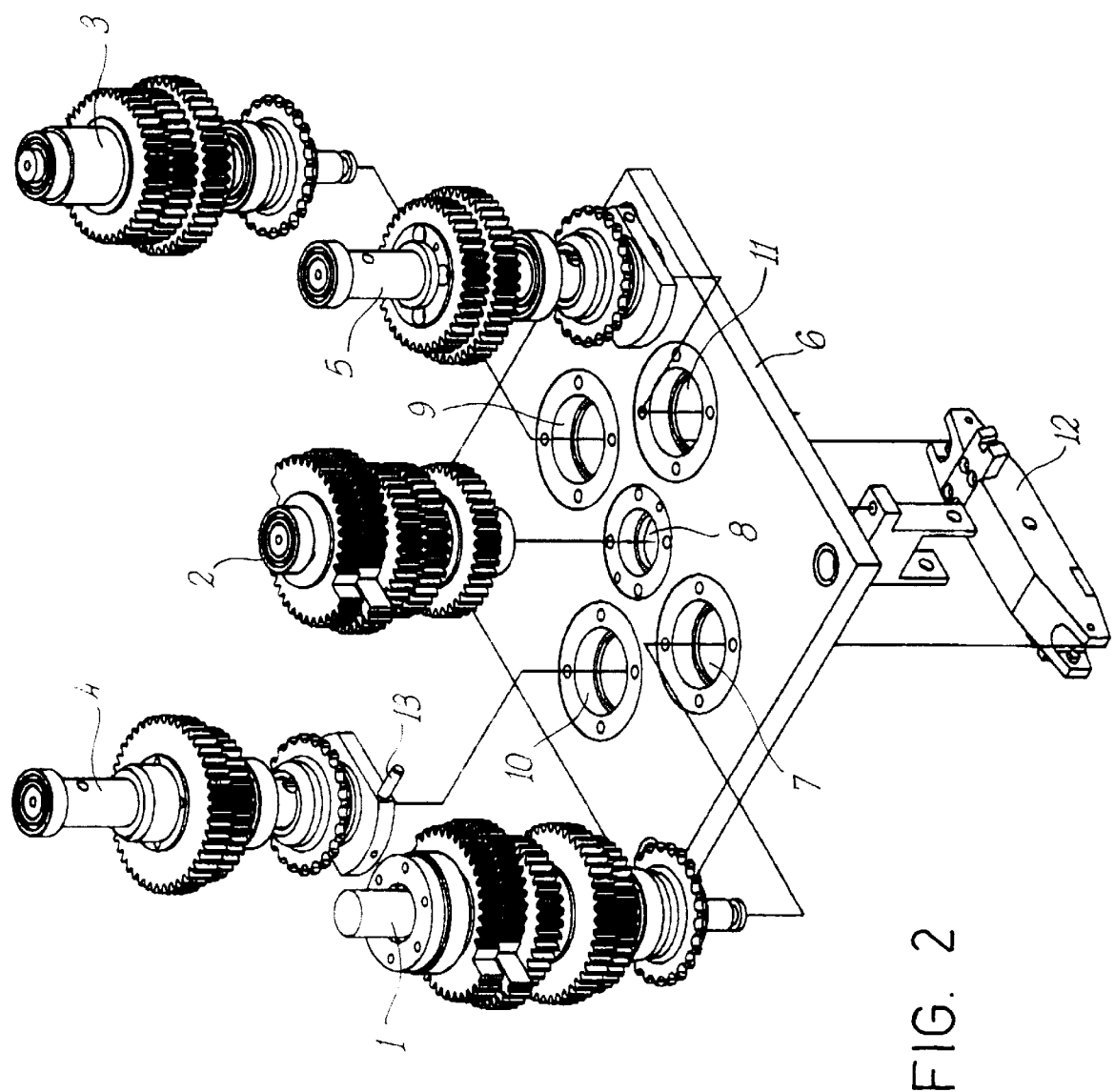
FIG. 2 is an exploded view of the differential of FIG. 1.
Figure 3:
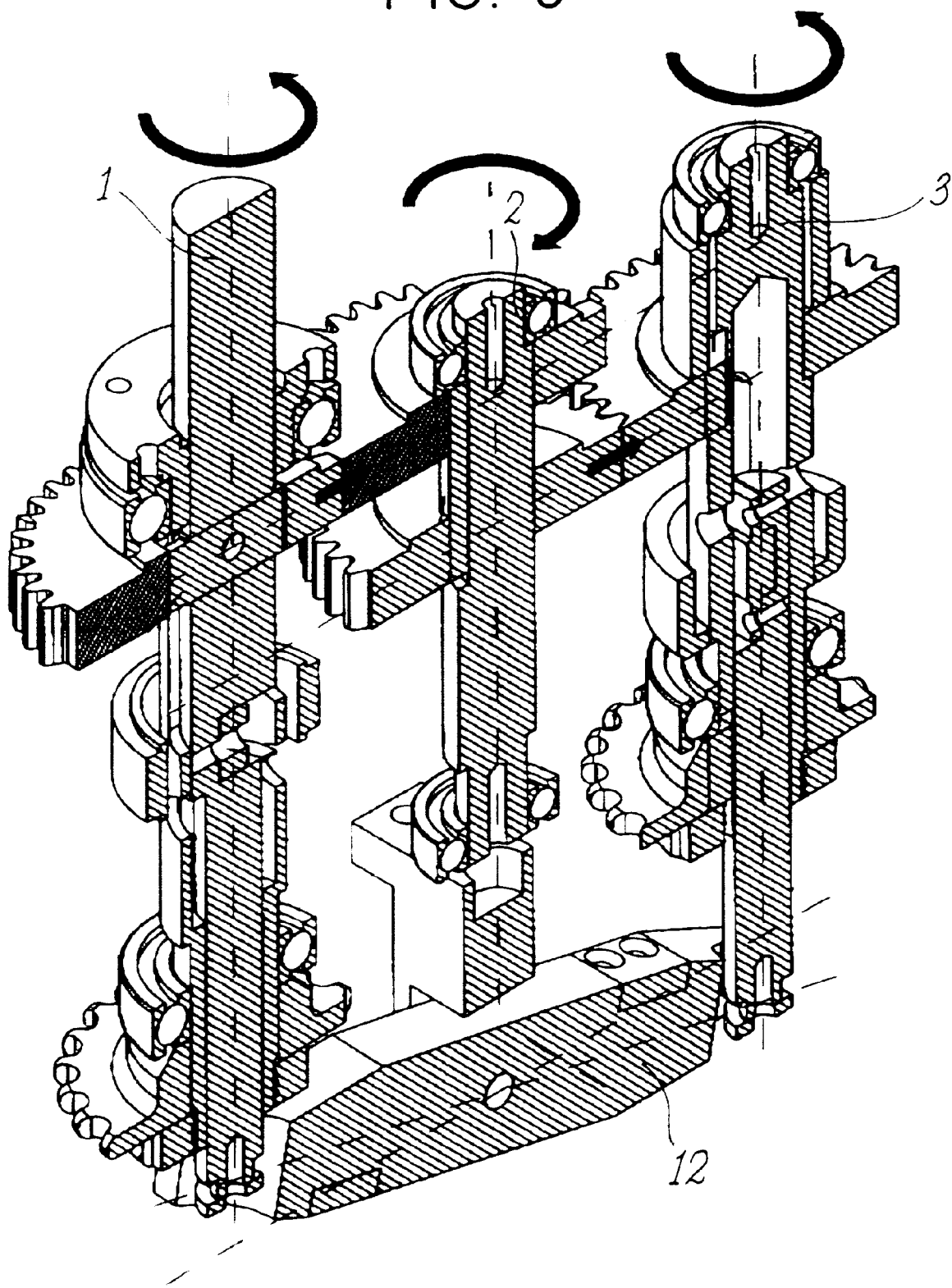
FIG. 3 is a section view taken along line III—III of FIG. 1.
Figure 5C:
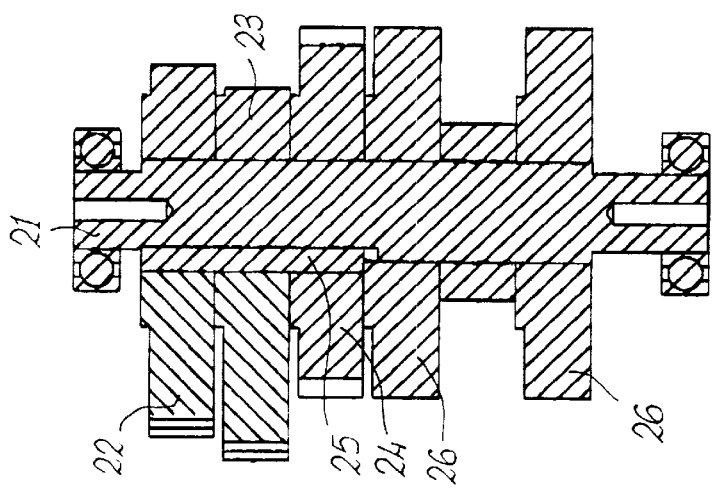
Figure 5A:
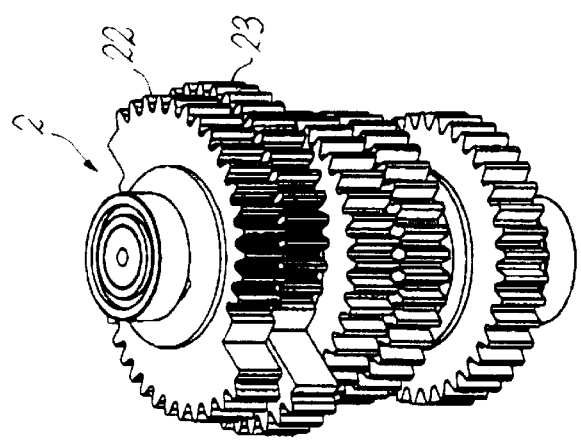
Figure 7A:
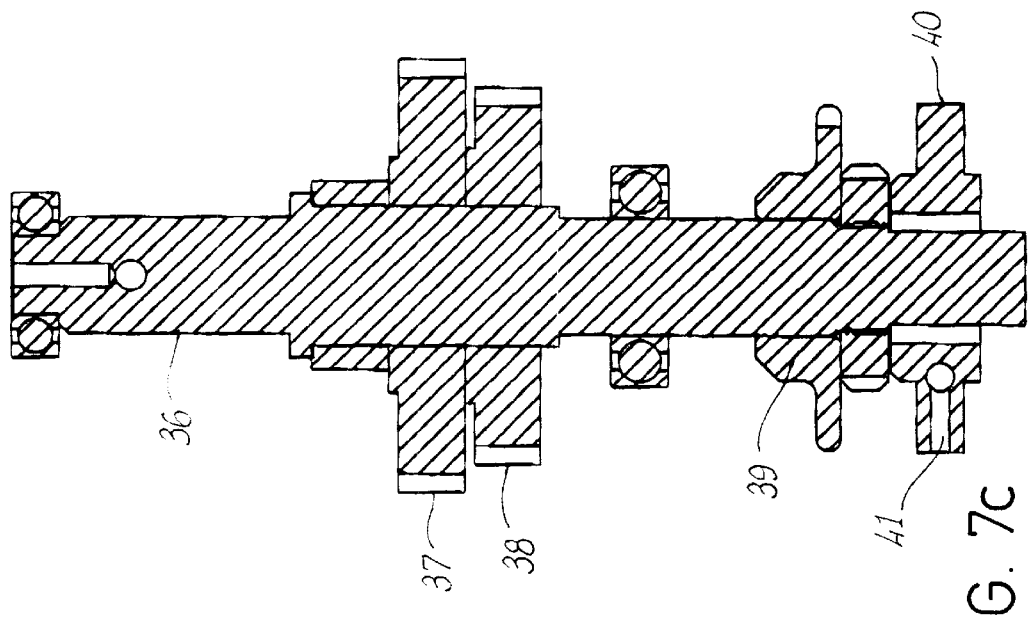
Figure 8:
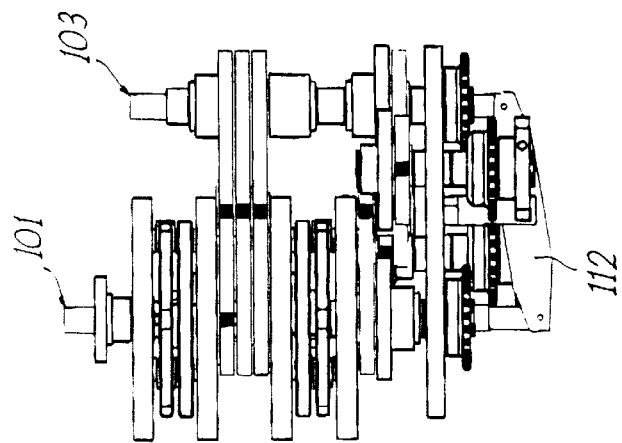
Figure 9:
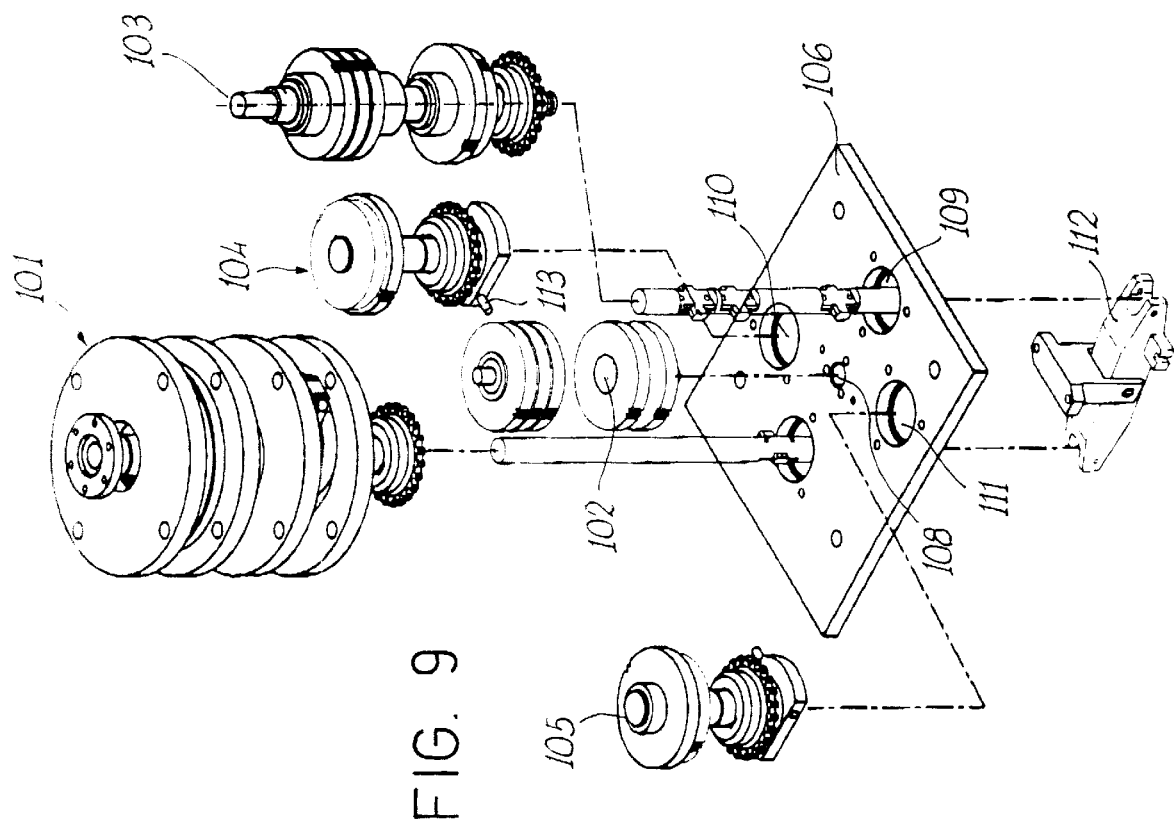
Figure 10:
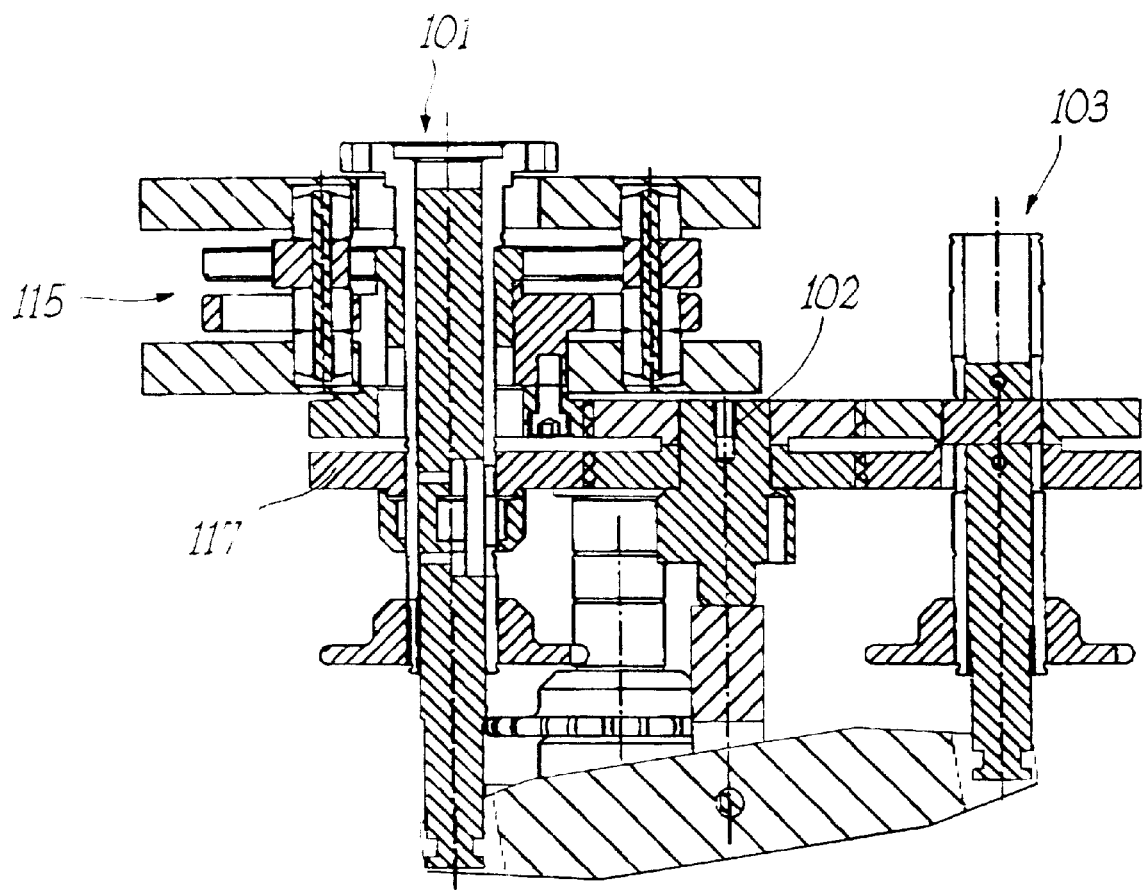
Figure 11:
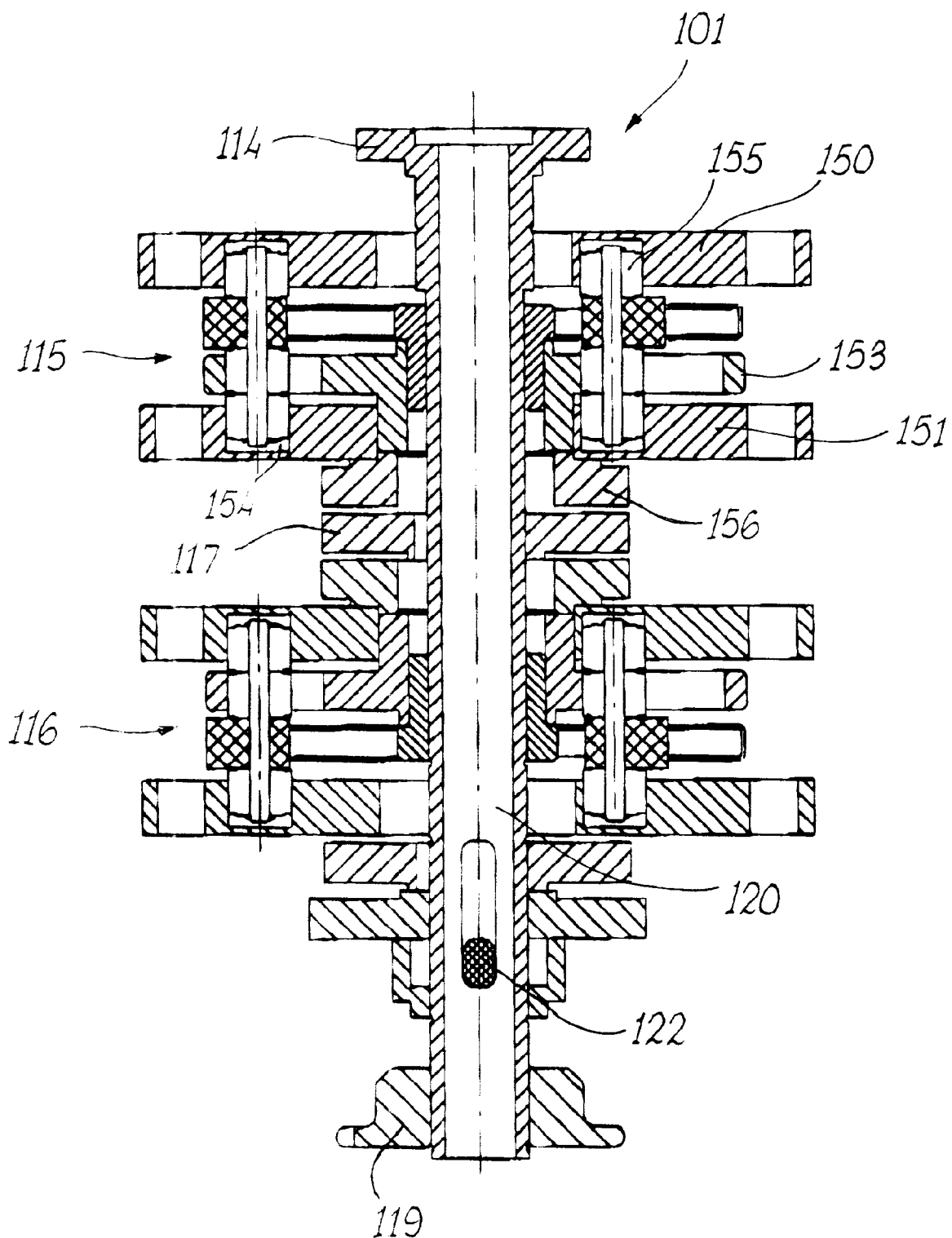
Figure 12:
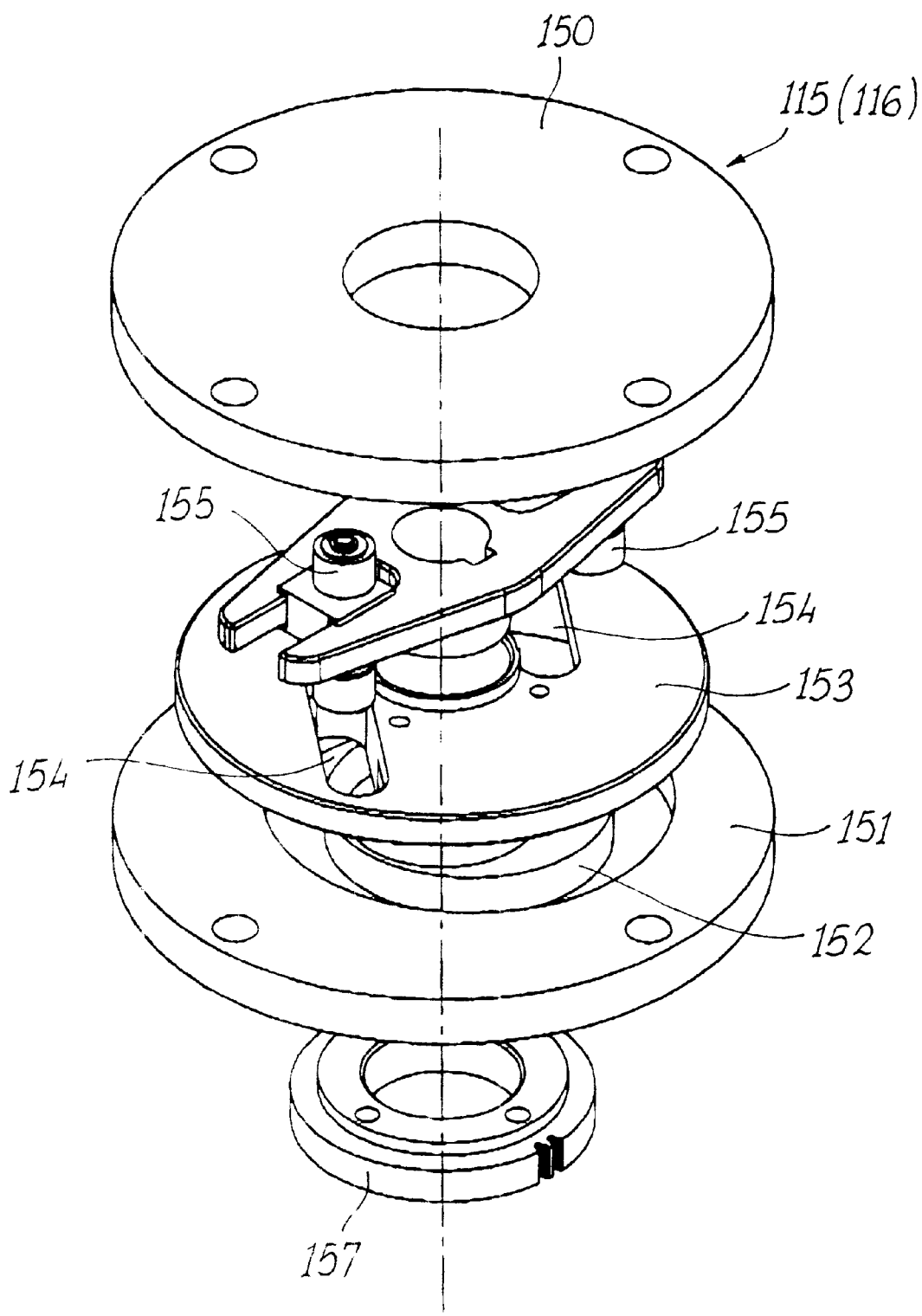
Figure 13:
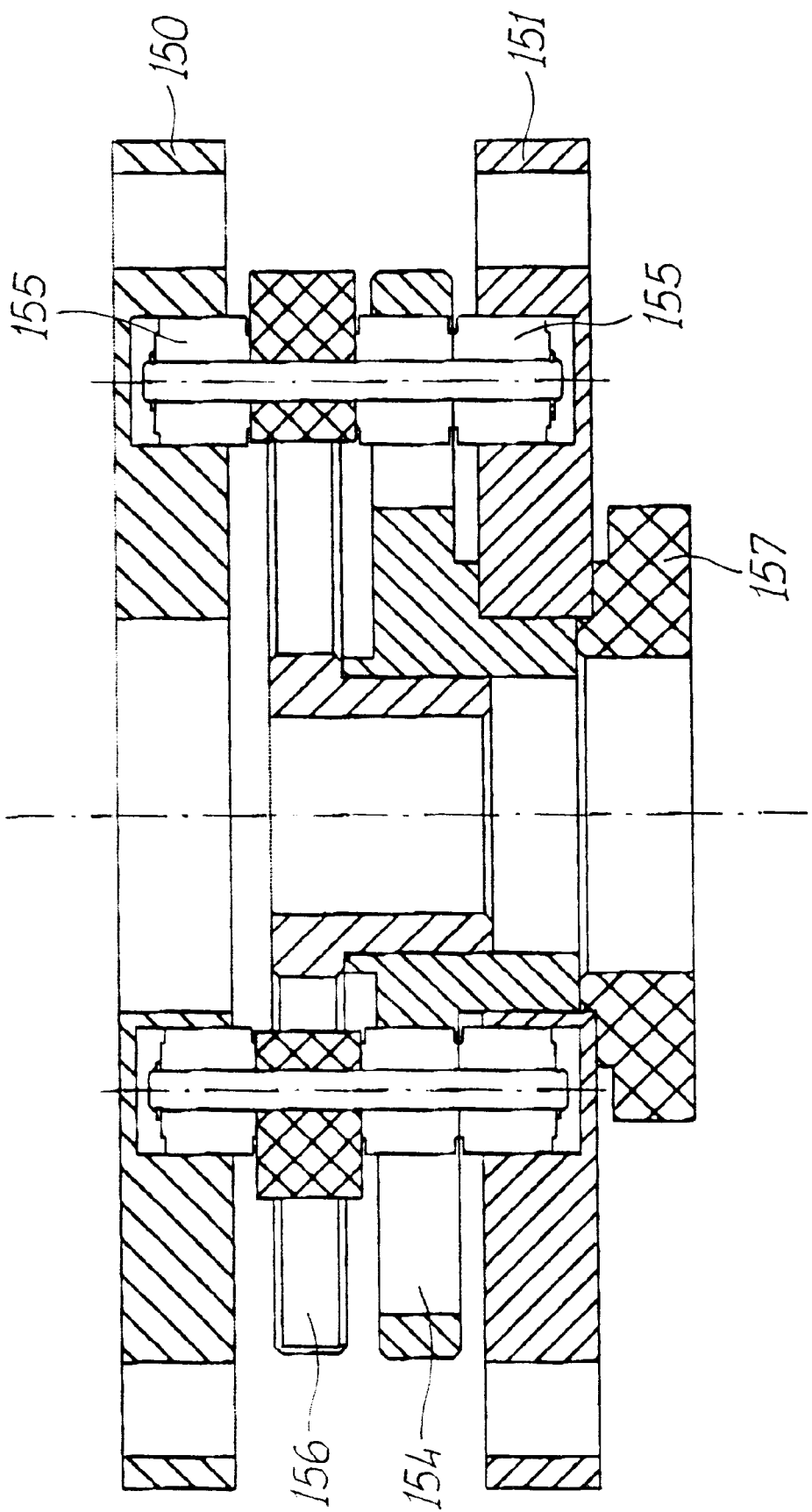
Figure 15:
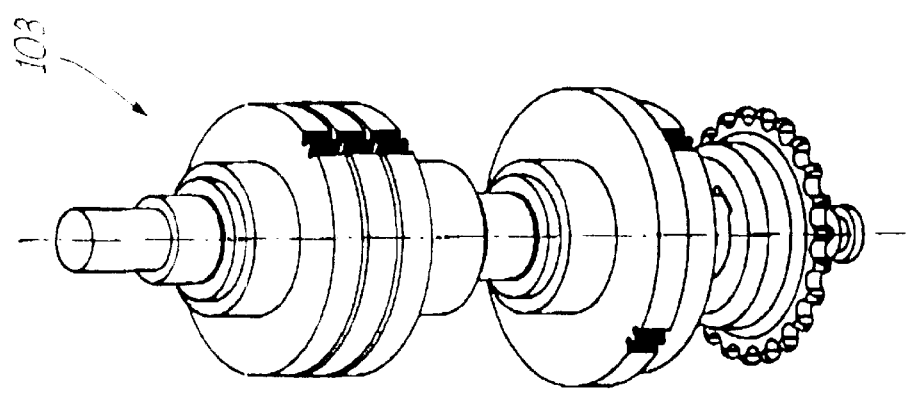
Figure 14B:
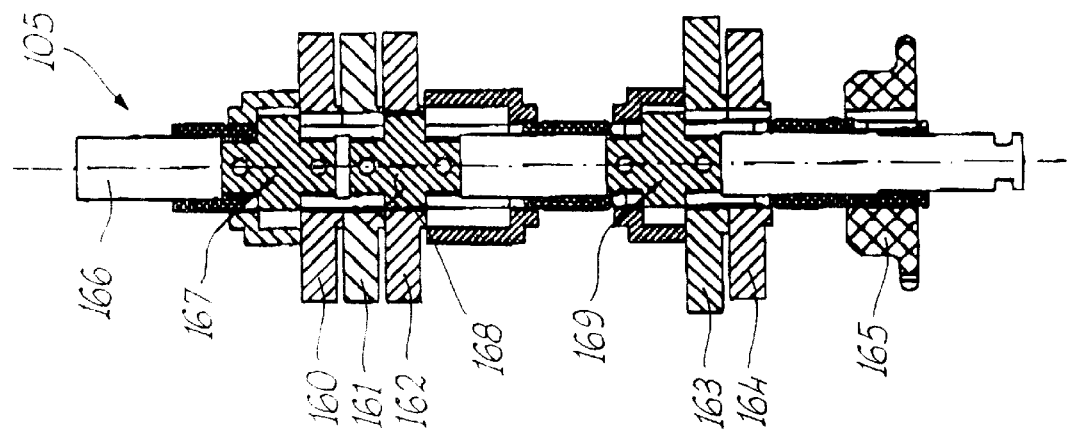
Figure 14A:
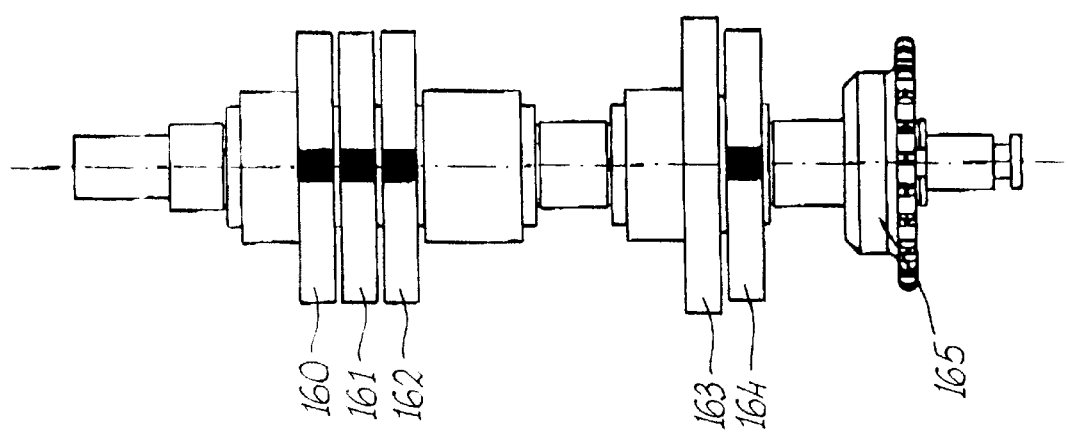
Figure 16:
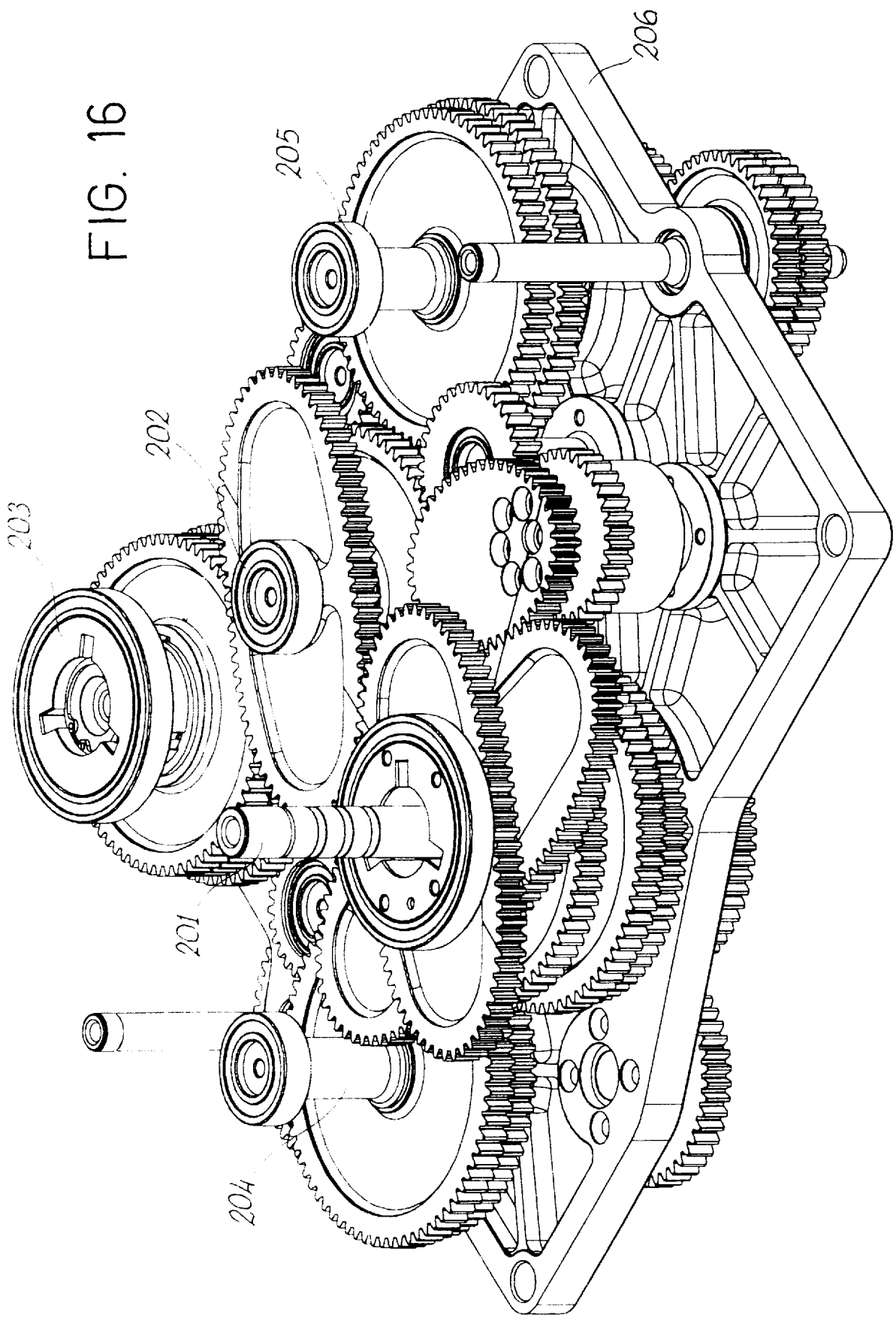
Figure 17:
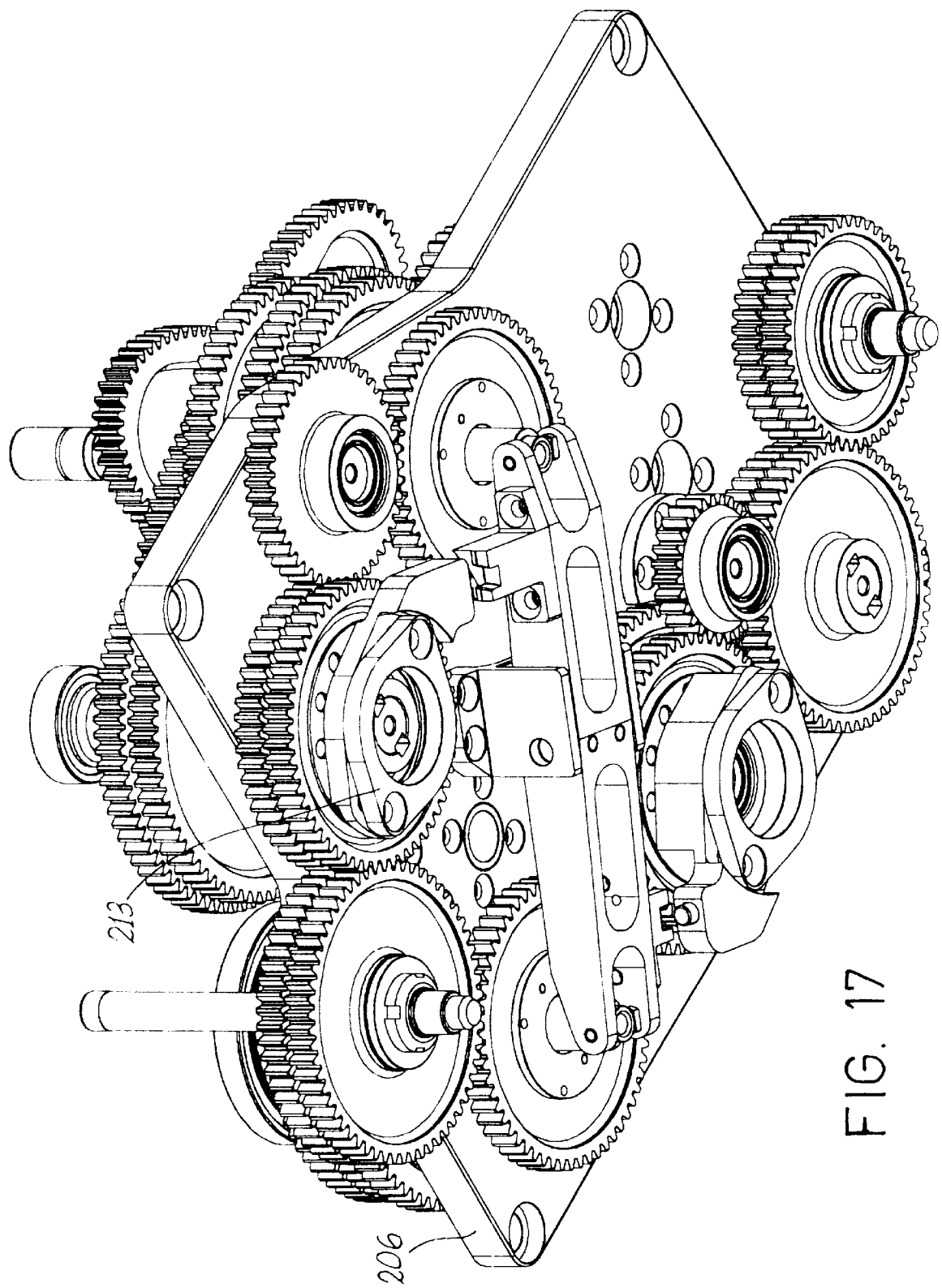
Figure 18:
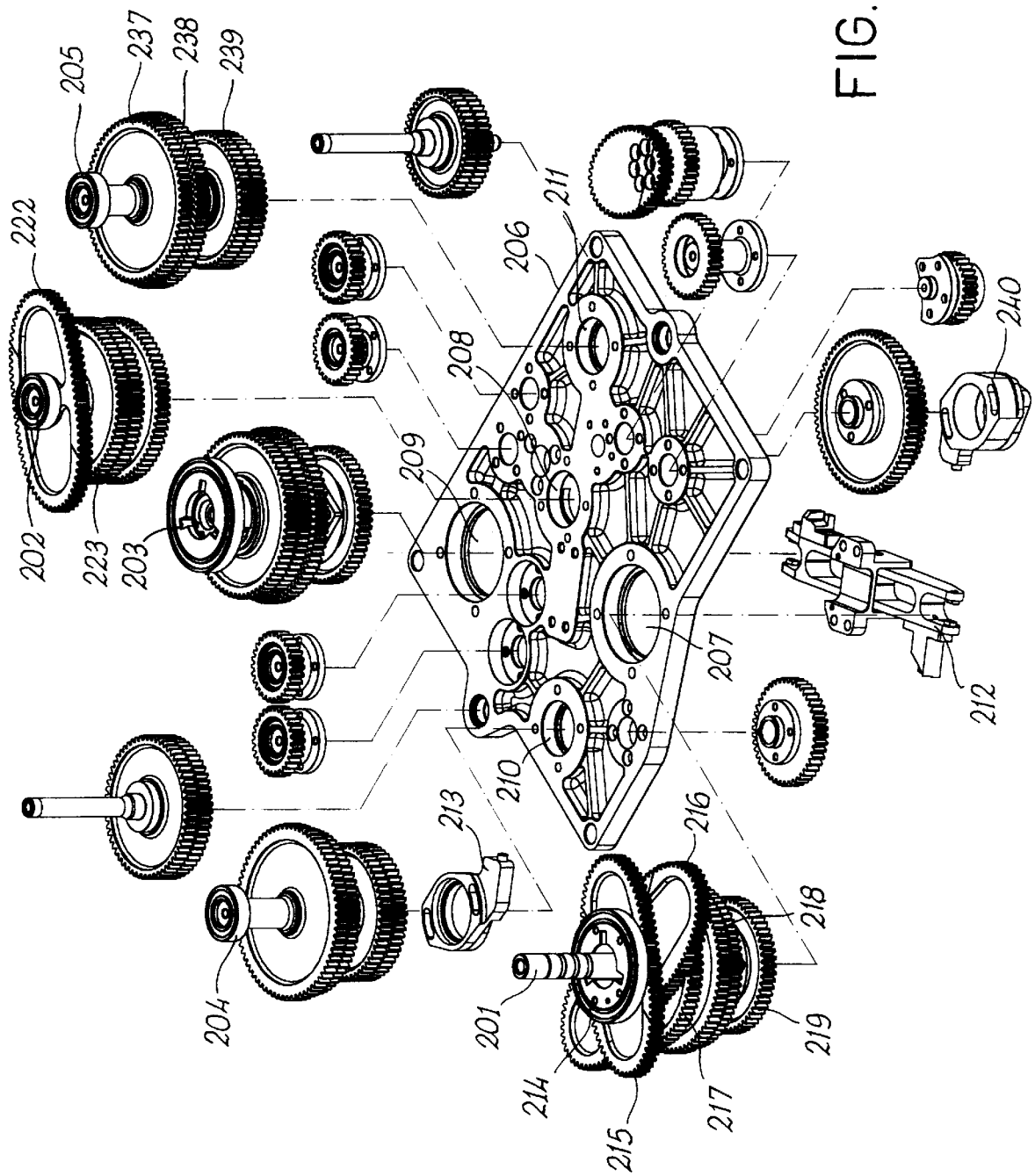
Figure 19:
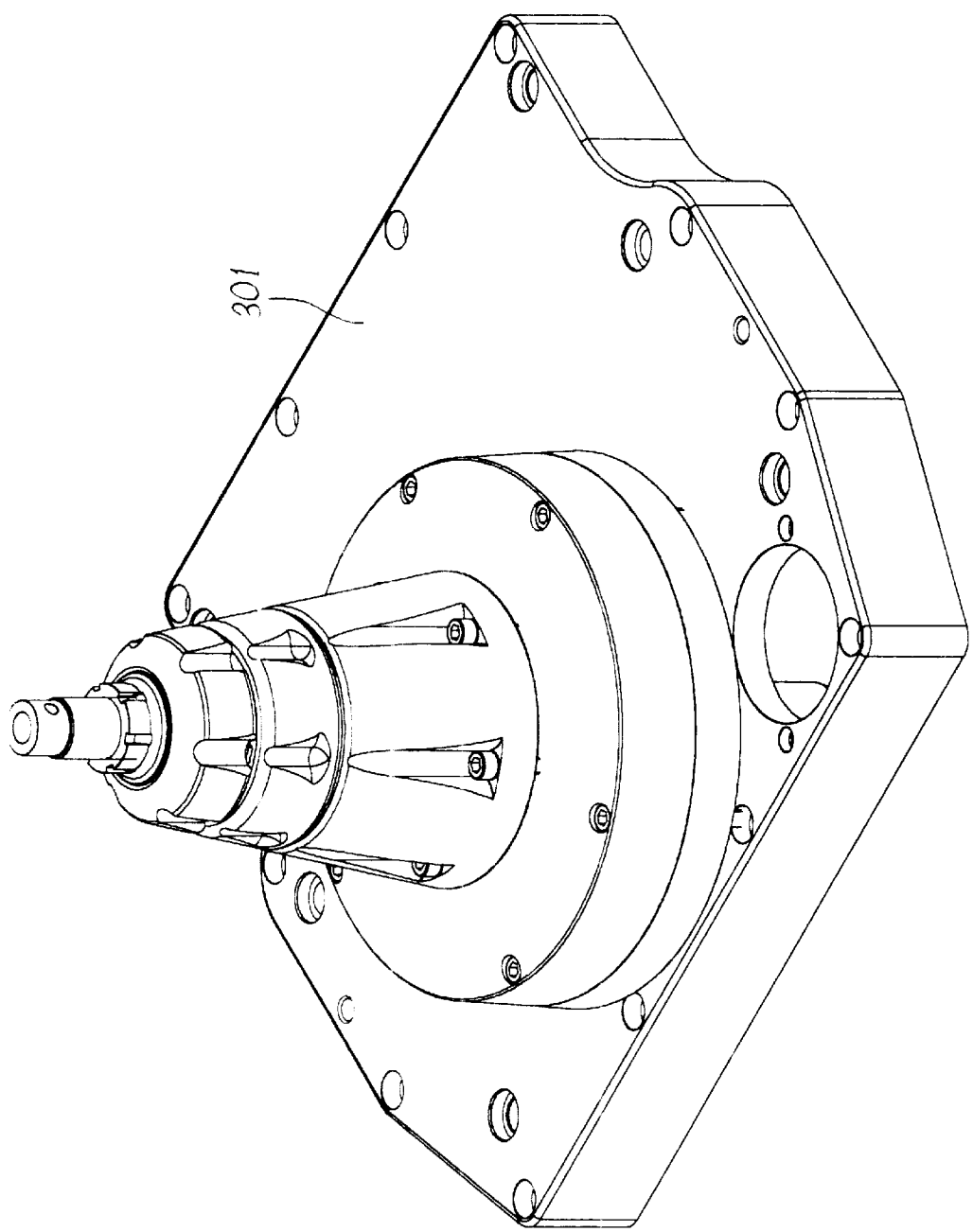
Figure 20:
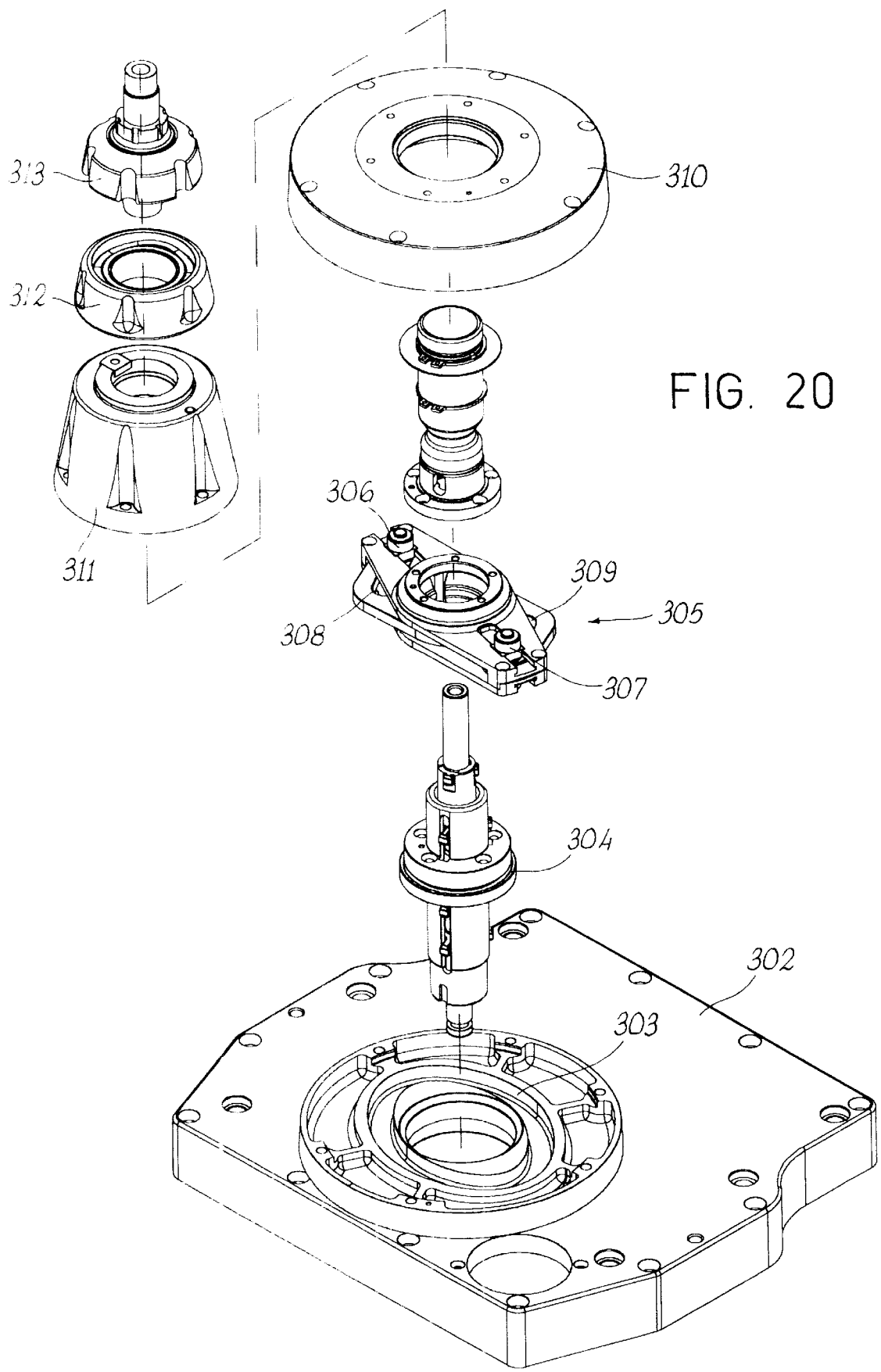

FIGS. 4a, b and c respectively are a perspective, exploded and section view of a first element of the differential according to the invention;

FIGS. 5a, b and c respectively are a perspective, exploded and section view of a second element of the differential according to the invention;

FIGS. 6a, b and c respectively are a perspective, exploded and section view of a third element of the differential according to the invention;

FIGS. 7a, b and c respectively are a perspective, exploded and section view of a fourth element of the differential according to the invention;

FIG. 8 is a lateral view of a second embodiment of a differential according to the invention;

FIG. 9 is an exploded view of the differential of FIG. 8;

FIG. 10 is a section view of the differential of FIG. 8;

FIG. 11 is a section view of a first element of the differential of FIG. 8;

FIG. 12 is an exploded view of an element of the first element of the differential shown in section in FIG. 11;

FIG. 13 is a section view of the element shown in FIG. 12;;

FIGS. 14a–b respectively are front and section view of the axis of the right wheel of the differential of FIG. 8;

FIG. 15 is a perspective view of the output axis of the differential of FIG. 8;

FIG. 16 is a top perspective view of a third embodiment of the differential according to the invention;

FIG. 17 is a bottom perspective view of the differential of FIG. 16;

FIG. 18 is an exploded view of the differential of FIG. 16;

FIG. 19 is a perspective view of a power steering to be used with the differential according to the invention; and FIG. 20 is an exploded view of the power steering of FIG. 19.

Referring first to FIGS. 1–7 of the enclosed drawings, it is shown a first embodiment of the differential according to the invention, providing an inlet axis 1, a transmission axis 2, an output axis 3, a left lateral axis 4 and a right lateral axis 5.

Said axis 1–5 are placed on a plate 6 provided with suitable through holes 7–11, corresponding to each of said axis, in such a way to interact, as it will be described in the following, with the rocking lever 12 and/or transmit the motion to the wheels (not shown).

The inlet axis 1 receives the control from the bar (not shown), in order to select one of the three configurations (two of four steering wheels, or crab configuration) for the wheels of the dolly.

In case of crab operation, a direct transmission is obtained (1:1 ratio), while in case of two or four steering wheels, the rocking lever 12 and the lateral axes 4, 5 intervene.

Particularly, axes 4, 5 have the duty of inverting the rotation direction with respect to the rotation coming form the inlet axis 1.

Furthermore, in case of two steering wheels, axes 4 and 5, by the pins 13, acts on the rocking lever 12 to block the wheels that must not operate as steering wheels.

Moreover, always in case of four steering wheels, either two or four steering wheels, while axis 4 transmits the motion directly to the wheels on the left axis of the wheels, axis 5 must invert the motion to allow the correct rotation of the same wheels.

In the following the various axis 1–5 will be described in detail. Particularly, in FIGS. 4a–4c, inlet axis 1 is shown, comprising a column 14 axis, rotating about 360, a first semi-elliptical gear 15, for the motion with two steering wheels, a second semi-elliptical gear 16, for the motion with four steering wheels, and a cylindrical gear 17 for the crab motion.

Further, they are provided a gear 18 to transfer the four steering wheel motion to the left axis 4, and a crown gear 19 to transfer the motion to the rear wheel, by a chain (not shown).

BY the reference number 20 it is indicated the speed gear axis, that can take three vertical positions, by the key 22, which is movable with respect to the column axis 14, in such a way to determine one of the three configurations.

Figure 5B:
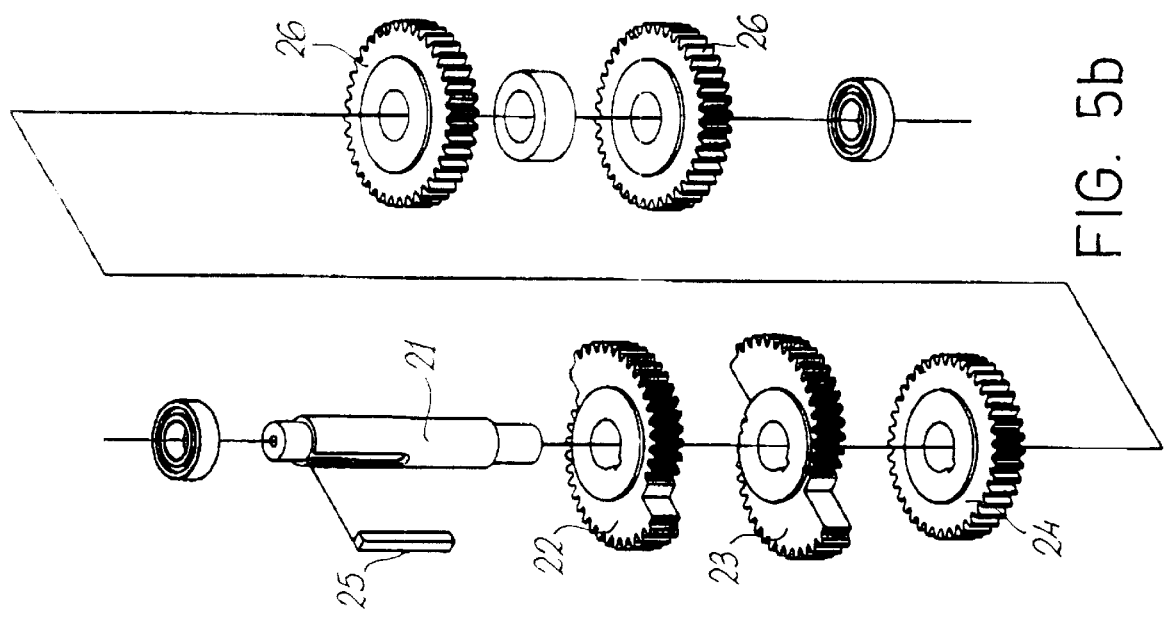

Coming now to observe FIGS. 5a–5c, transmission axis 2 is shown, comprising an inversion 21, a first semi-elliptical gear 22, for the motion with two steering wheels, a second semi-elliptical gear 23, for the motion with four steering wheels, and a cylindrical gear 24 for the crab motion, all of them being integral with the inversion axis by the key 25.

Furthermore, two idle gears 26 are provided to transfer the crab motion to the axes 4 and 5.

Observing now FIGS. 6a–6c, output axis 3 is shown, comprising an outlet 27 axis, provided on the inside with a speed gear transmission axis 28, with key 29.

It further provides a first cylindrical gear 30, for the crab configuration, a second cylindrical gear 31, to transfer the four wheel motion to the right axis 6 and a crown gear 32 to transfer the motion to the rear right wheel, by a chain (not shown), and provided a coupling key 33.

Above the output shaft, a cylindrical gear 34 is provided, receiving the inverted motion, with a movable key 35, in function of the set configuration.

Figure 7B:
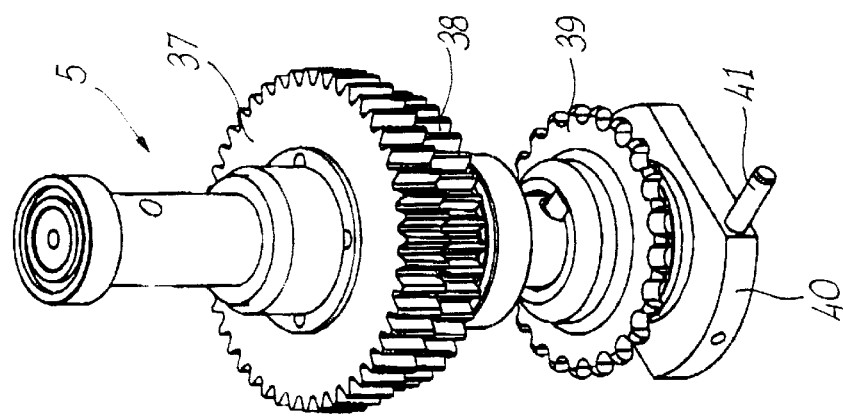
Figure 7C:
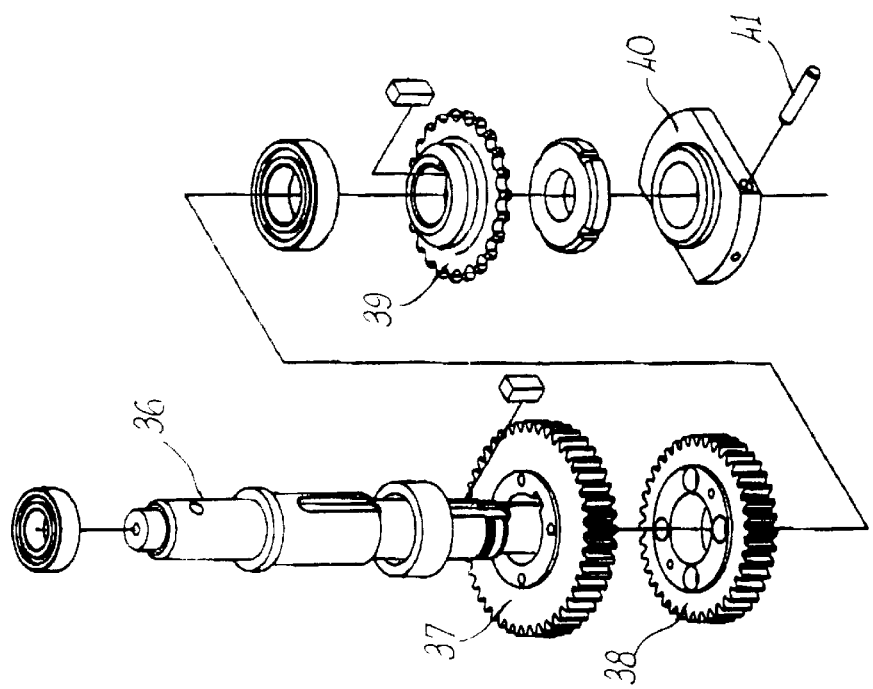

In FIGS. 7a–7c it is shown the axis 5 of the rear right wheel, the axis relevant to the front left wheel not being described and shown since it is substantially identical.

Said axis 5 comprises a lateral axis 36, on which they are provided a first cylindrical gear 37 to receive the four steering wheels motion from the inlet axis and transmit the same, and a second cylindrical gear 38 to receive the crab inverted motion and transmit the same.

It is further provided a toothed wheel 39 to transfer the motion of the right rear wheel, by a chain (not shown).

By reference number 40 it is indicated the blocking axis 36, on which a pin 41 is provided interacting with the rocking lever 12, as already described.

Coming now to observe FIGS. 8–14, it is shown a second embodiment of the differential according to the invention. Said embodiment is substantially identical to the one described with reference to FIGS. 1–7, even if the motion transmission provides different, even if equivalent, means Therefore, in the following specification, the same reference numbers will be used for the corresponding parts adding one hundredth.

Differential shown in FIGS. 8–15 provides an inlet axis 101, a transmission axis 102, an output axis 103, a left lateral axis 104 and a right lateral axis 105.

Said axis 101–105 are placed on a plate 106 provided with suitable through holes 107–111, corresponding to each of said axis 101–105, in such a way to interact, as it will be described in the following, with the rocking lever 112 and/or transmit the motion to the wheels (not shown).

The inlet axis 101 receives the control from the bar (not shown), in order to select one of the three configurations (two of four steering wheels, or crab configuration) for the wheels of the dolly.

In case of crab operation, a direct transmission is obtained (1:1 ratio), while in case of two or four steering wheels, the rocking lever 112 and the lateral axes 104, 105 intervene.

Particularly, axes 104 and 105 have the duty of inverting the rotation direction with respect to the rotation coming form the inlet axis 101.

Furthermore, in case of two steering wheels, axes 104 and 105, by the pins 113, acts on the rocking lever 112 to block the wheels that must not operate as steering wheels.

Moreover, always in case of four steering wheels, either two or four steering wheels, while axis 104 transmits the motion directly to the wheels on the left axis of the wheels, axis 105 must invert the motion to allow the correct rotation of the same wheels.

Main difference with respect to the preceding embodiment consists in the use of double cam differentials, that will be described in greater detail in the following, for the transmission of the two or four steering wheel motion, the cam profile being obviously different for each specific case, as well as it will be different the profile of the elliptical gear used in the preceding embodiment.

Another difference with respect to the preceding embodiment is the disposition of the transmission means along the inlet axis 101, being in this case interposed the gear 117 for the crab motion, between the two cams 115 and 116, respectively for the two of four steering wheel motion.

In FIG. 10, it is shown a hybrid realisation providing only two movements, respectively two steering wheel, using cam 115, and crab, by the circular gear 117.

In the following, various axis 101–105 will be described.

Observing particularly FIG. 11, it can be observed inlet axis 101 providing a column axis 114, a first double cam 115, for the four steering wheel motion, a second double cam 116, for the two steering wheel motion, a cylindrical gear 117 for the crab motion, provided between said two cams 115 and 116.

Making reference also to FIG. 12, it can be noted how each double cam 115 (116) is realised, providing an upper roll guide cam 150 and a lower roll guide cam 151. Each one of said cams 150, 151 is internally profiled, in function of the motion to be transmitted, between which a disc is interposed, said disc providing two slots 154, wherein two rolls 155 slide, said rolls 155 following the inner profile 152, dragged by a dragging fork 156.

The motion of the inlet axis 101, in case the two or four steering wheel motion is selected by the dolly control bar (not shown), is transmitted to the transmission axis by the outlet 157, and a coupling by a chain or direct transmission.

It is further provided a crown gear 119 to transfer the motion to the rear wheel by a chain (not shown).

By reference number 120 it is indicated the speed gear axis, that can take three vertical positions, with key 122 movable with respect to the column axis 114, in such a way to determine one of the three configurations.

In FIGS. 14a–14b it is shown the axis 105 of the right rear wheel, the axis relevant to the front left wheel not being described and shown since it is substantially identical.

Said axis 105 comprises an outlet 160 for the four steering wheels, an outlet 161 with a 1:1 ration for the crab motion, and an outlet 162 for the two steering wheels.

It further provides a transmission 163 to the front wheel for the four steering wheels, a transmission 164, for the transmission to the front wheel for a 1:1 transmission ratio (crab), and a crown gear 165 for the transmission to the right rear wheel.

Moreover, three movable keys 167, 168, 169 are provided within the transmission rod 166, for fixing the various positions.

Finally, in FIG. 15 the output axis 103 is described, said axis being coupled by chains of direct transmission.

Referring now to FIGS. 16–18 of the enclosed drawings, it is shown a third embodiment of the differential according to the invention, the parts of which corresponding to those of the first embodiment are indicated by the same reference numbers preceded by 200.

The differential shown provides an inlet axis 201, a transmission axis 202, an output axis 203, a left lateral axis 204 and a right lateral axis 205.

Said axis 201–205 are placed on a plate 206 provided with suitable through holes 207–211, corresponding to each of said axis, in such a way to interact, as it will be described in the following, with the rocking lever 212 and/or transmit the motion to the wheels (not shown).

The inlet axis 201 receives the control from the bar (not shown), in order to select one of the three configurations (two of four steering wheels, or crab configuration) for the wheels of the dolly.

In case of crab operation, a direct transmission is obtained (1:1 ratio), while in case of two or four steering wheels, the rocking lever 212 and the lateral axes 204, 205 intervene.

Particularly, axes 204, 205 have the duty of inverting the rotation direction with respect to the rotation coming form the inlet axis 201.

Furthermore, in case of two steering wheels, axes 204 and 205, by the pins 213, acts on the rocking lever 212 to block the wheels that must not operate as steering wheels.

Moreover, always in case of four steering wheels, either two or four steering wheels, while axis 204 transmits the motion directly to the wheels on the left axis of the wheels, axis 205 must invert the motion to allow the correct rotation of the same wheels.

In the embodiment shown in FIGS. 16–18, elliptical gears with straight teeth are employed.

Connection between various axes is obtained by a plurality of gears represented in the figures, having the sole object of transferring the various motion from one axis to the other one.

Each one of the axis 201–205 provides a number of gears corresponding to the number provided for axis 1–5 described in detail with reference to the preceding FIGS. 4–7, having the same kind of function for the operation of the differential according to the invention.

Coming now to observe FIGS. 19 and 20, it is shown an embodiment of a power steering that can be used with any of the differentials described in the above.

Particularly, in FIG. 19 it is shown a housing 301 for a power steering, the components of which are shown in greater detail in FIG. 20.

Said power steering is interposed between the control bar and the differential.

The solution described in FIG. 20 provides a base 302 on which a slot 303 having an eccentric profile and a central hole is obtained, through which a sleeve 304 passes.

Said sleeve 304 passes through a group 305, providing two lateral bearings 306, 307, slidable along suitable slots 308, 309, and a central bearing, not shown, slidable along a S-shaped slot. Said bearings couple with the eccentric slot 303 and a corresponding eccentric slot realised on the cover 310.

Above the group 305 an axis 311 is coupled, coming out from the cover 310. Covering elements 311, 312, 313 are provided on said cover 310.

Instead of the group providing the bearings and the eccentric tracks, the power steering can be realised employing suitable gears.

The present invention has been described for illustrative but not limitative purposes, according to its preferred embodiments, but it is to be understood that modifications and/or changes can be introduced by those skilled in the art without departing from the relevant scope as defined in the enclosed claims.

What is claimed is:

1. A differential for a dolly, for shootings in the TV and movie fields, comprising a first, inlet axis, coupled with a selection and control bar, provided on the dolly, for the selection of one among the two steering wheels, four steering wheels or crab configuration, said inlet axis being provided with motion transmission means for the two steering wheel configuration, with motion transmission means for the four steering wheel configuration, and with motion transmission means for the crab configuration; a motion output axis; and two lateral axes, respectively for the transmission to the left wheel and to the right wheel, said inlet axis and said output axis providing central movable axis to selectively engage said transmission means, coupled at the bottom with rocking lever means, transmitting the position of the movable central axis of the inlet axis to the movable central axis of the output axis, and wherein said inlet axis, output axis, and transmission means are arranged on a support so as to establish a gear-to-gear transmission relationship, and wherein said left and right lateral axes and said transmission means are further arranged on the support so as to establish a gear-to-gear transmission relationship.

2. The differential according to claim 1, wherein said lateral axes provide motion transmission means to the relevant rear wheel and blocking means for the same wheels in case of two steering wheel configuration.

3. The differential according to claim 1, wherein said two steering wheel and four steering wheel motion transmission means provide elliptical gears, provided on said inlet, transmission and output axes, having a profile suitable to the kind of selected motion.

4. The differential according to claim 1, wherein said two steering wheel and four steering wheel motion transmission means provide cam structures, preferably double cam structures, with a profile realized on said cam, shaped in function of the particular motion to be transmitted, slide guided by rolls, the motion of the transmission axis and/or output axis being transmitted by chains or direct transmission.

5. The differential according to claim 1, wherein said inlet, transmission, output and right and left axes are provided between an upper plate and a lower plate, holes being provided on said plates for the passage of said axes.

6. The differential according to claim 1, wherein said axis is coupled by motion transfer gears.

7. The differential according to claim 1, wherein a power steering is provided between said differential and the control bar.

8. A differential for a dolly, for shootings in the TV and movie fields, comprising a first, inlet axis, coupled with a selection and control bar, provided on the dolly, for the selection of one among the two steering wheels, four steering wheels or crab configuration, said inlet axis being provided with motion transmission means for the two steering wheel configuration, with motion transmission means for the four steering wheel configuration, and with motion transmission means for the crab configuration; a motion output axis; and two lateral axes, respectively for the transmission to the left wheel and to the right wheel, said inlet axis and said output axis providing central movable axis to selectively engage said transmission means, coupled at the bottom with rocking lever means, transmitting the position of the movable central axis of the inlet axis to the movable central axis of the output axis, and in that two steering wheel and four steering wheel motion transmission means provide elliptical gears, provided on said inlet, transmission and output axes, having a profile suitable to the kind of selected motion.

9. The differential according to claim 8, herein said lateral axes provide motion transmission means to the relevant rear wheel and blocking means for the same wheels in case of two steering wheel configuration.

10. The differential according to claim 8, wherein said two steering wheel and four steering wheel motion transmission means provide cam structures, preferably double cam structures, with a profile realized on said cam, shaped in function of the particular motion to be transmitted, slide guided by rolls, at least one of the motion of the transmission axis and the output axis being transmitted by chains or direct transmission.

11. The differential according to claim 8, wherein said inlet, transmission, output and right and left axes are provided between an upper plate and a lower plate, holes being provided on said plates for the passage of said axes.

12. The differential according to claim 8, wherein said axis is coupled by motion transfer gears.

13. The differential according to claim 8, wherein a power steering is provided between said differential and the control bar.

* * * * *